United States Patent [19]
Boneau

[11] 3,779,315
[45] Dec. 18, 1973

[54] PRODUCTION METHOD

[75] Inventor: David F. Boneau, Bartlesville, Okla.

[73] Assignee: Phillips Petroleum Company, Bartlesville, Okla.

[22] Filed: Aug. 29, 1972

[21] Appl. No.: 284,483

[52] U.S. Cl.............. 166/268, 166/294, 166/295, 166/274
[51] Int. Cl. E21b 43/18, E21b 33/138, E21b 43/20
[58] Field of Search............. 166/294, 295, 263, 166/268, 305 R, 274, 273, 269, 314

[56] References Cited
UNITED STATES PATENTS

| | | | |
|---|---|---|---|
| 2,514,259 | 7/1950 | Roberts | 166/273 |
| 2,713,906 | 7/1955 | Allen | 166/294 |
| 3,093,192 | 6/1963 | Allen | 166/294 |
| 3,207,218 | 9/1965 | Holbrook et al. | 166/305 R |
| 3,368,624 | 2/1968 | Heuer, Jr. et al. | 166/305 R |
| 3,400,761 | 9/1968 | Latimer, Jr. et al. | 166/294 X |
| 3,491,832 | 1/1970 | Raza | 166/305 R X |
| 3,587,737 | 6/1971 | Tosch | 166/294 X |
| 3,366,175 | 1/1968 | Ferrell et al. | 166/269 X |

Primary Examiner—Stephen J. Novosad
Attorney—Quigg & Oberlin

[57] ABSTRACT

A method of producing hydrocarbons from a subterranean hydrocarbon containing formation and reducing the flow of gas from a gas cap of the formation by passing a preselected volume of polymeric solution into the formation at an elevation lower than the gas cap, terminating the injecting of the polymeric solution, and producing fluid entering the well bore while at least intermittently injecting one of a gas-water admixture or volumes of gas and water into the gas cap.

14 Claims, 11 Drawing Figures

THICKNER: PARTIALLY HYDROLYZED POLYACRYLAMIDE
MOLECULAR WEIGHT IN EXCESS OF $1.0 \times 10^6$
1-10 % HYDROLYZED, 3000 PPM
CORE: GRAYBERG LIMESTONE
SOUTH COWDEN UNIT
ECTOR COUNTY, TEXAS
$K_{AIR} = 70$ MD
BRINE: SOUTH COWDEN BRINE, 77,000 PPM

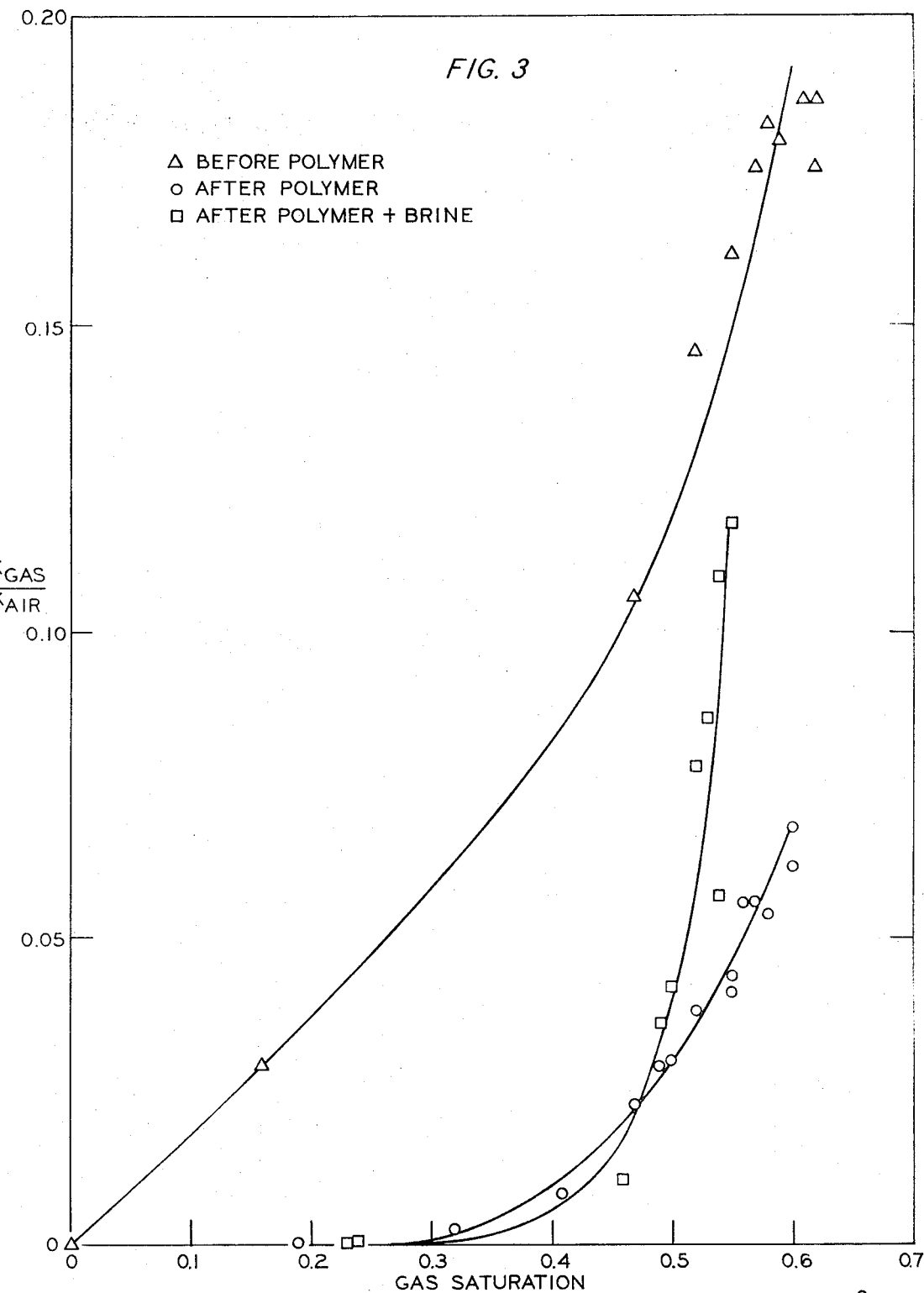

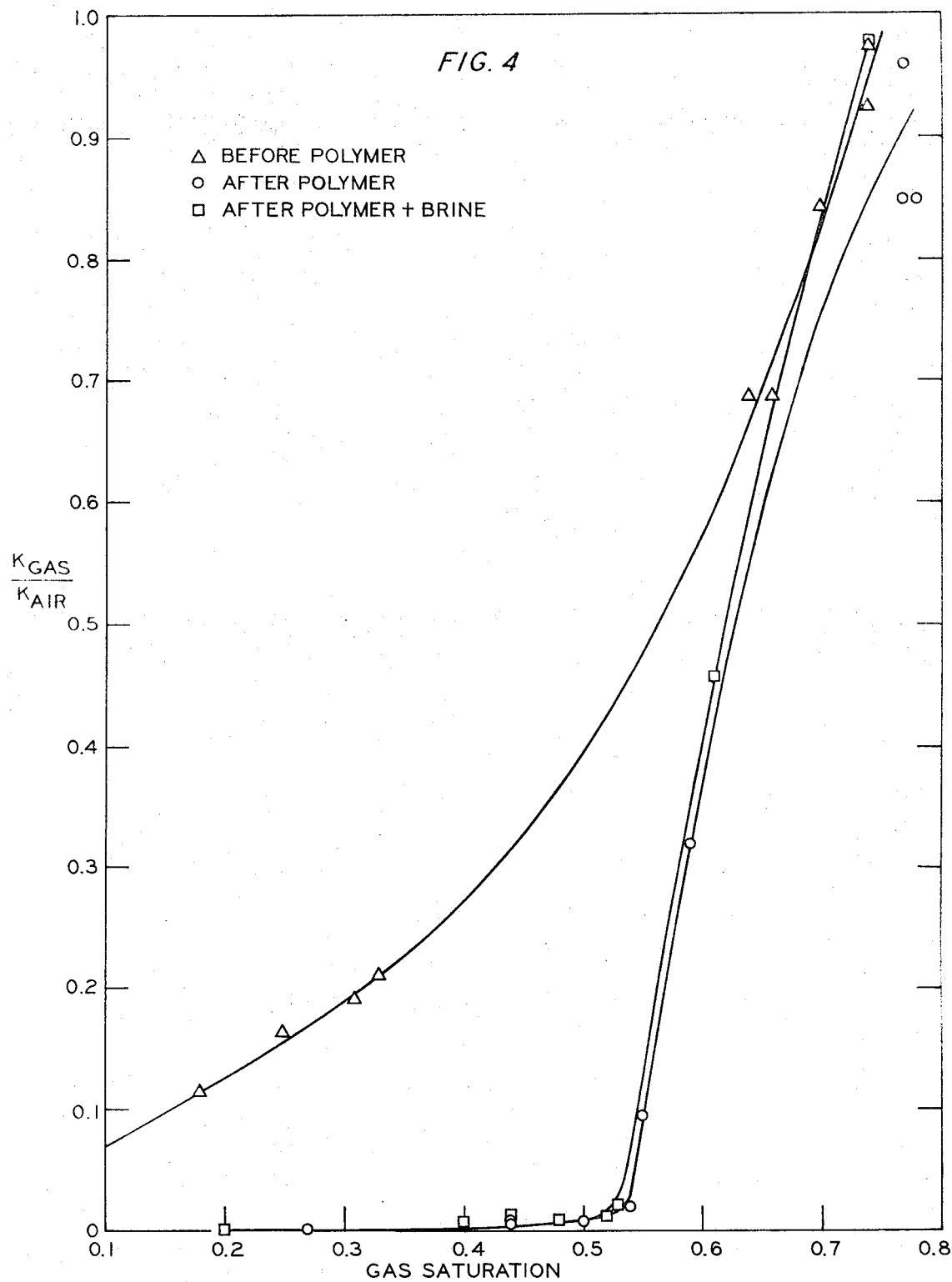

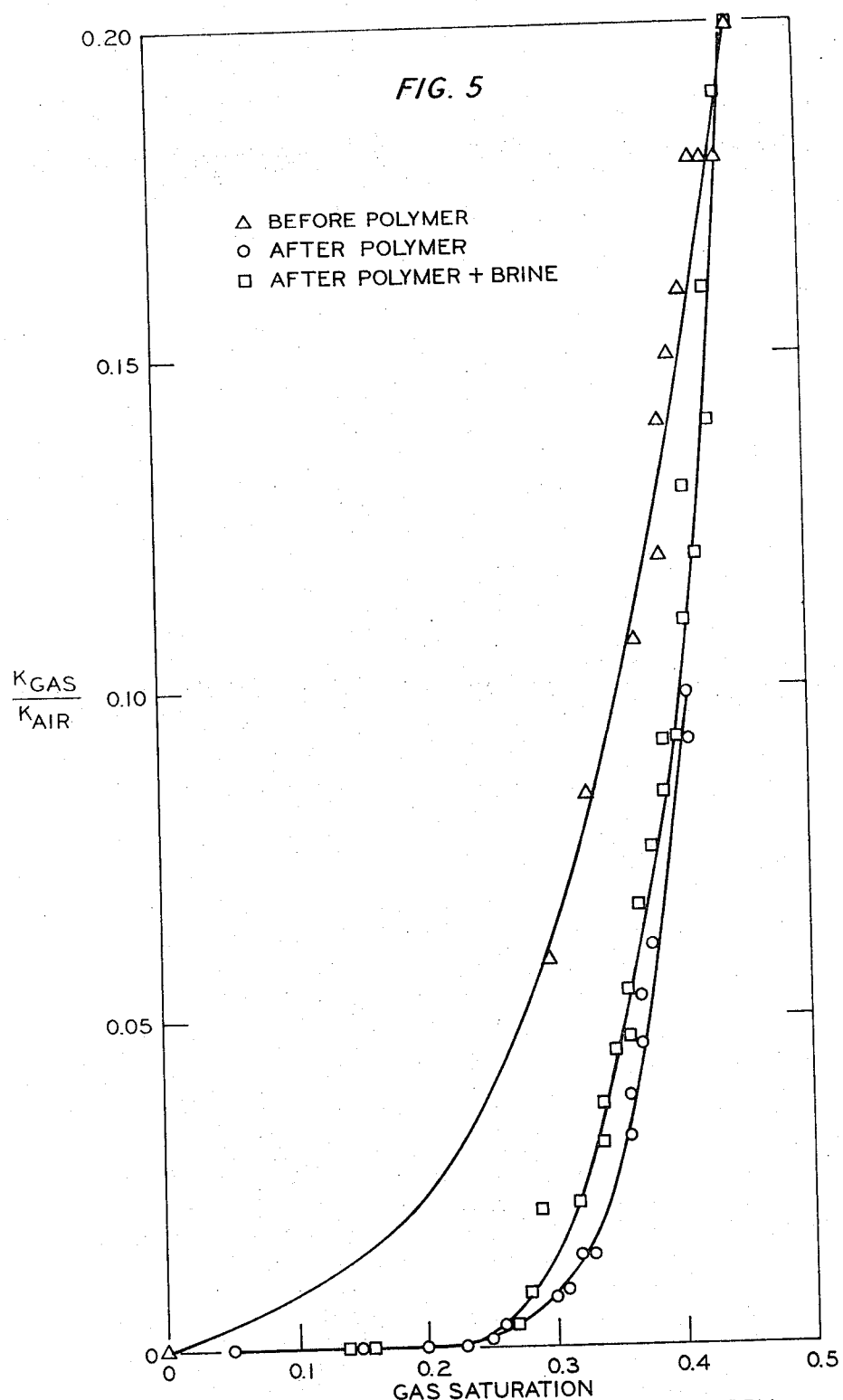

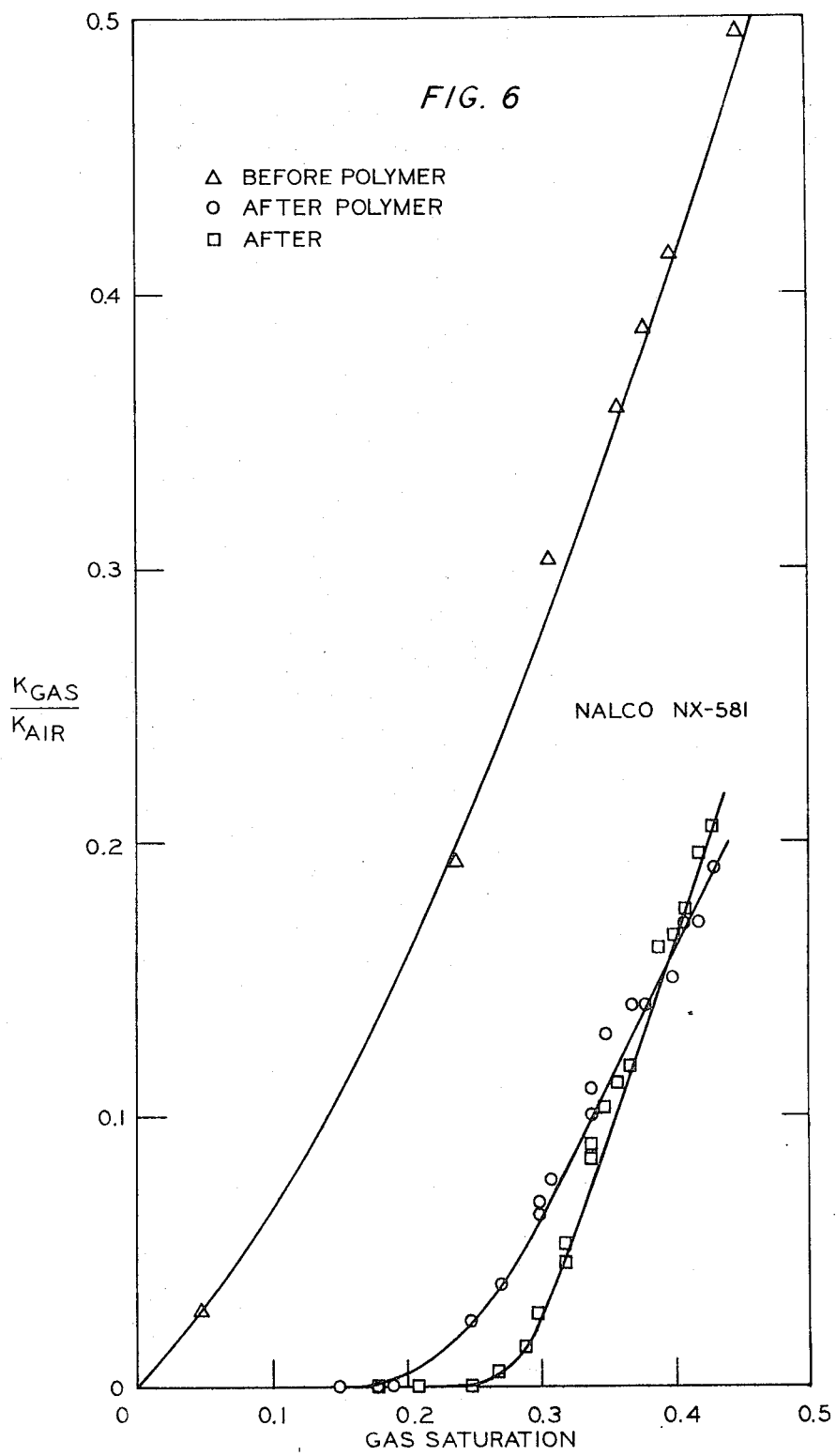

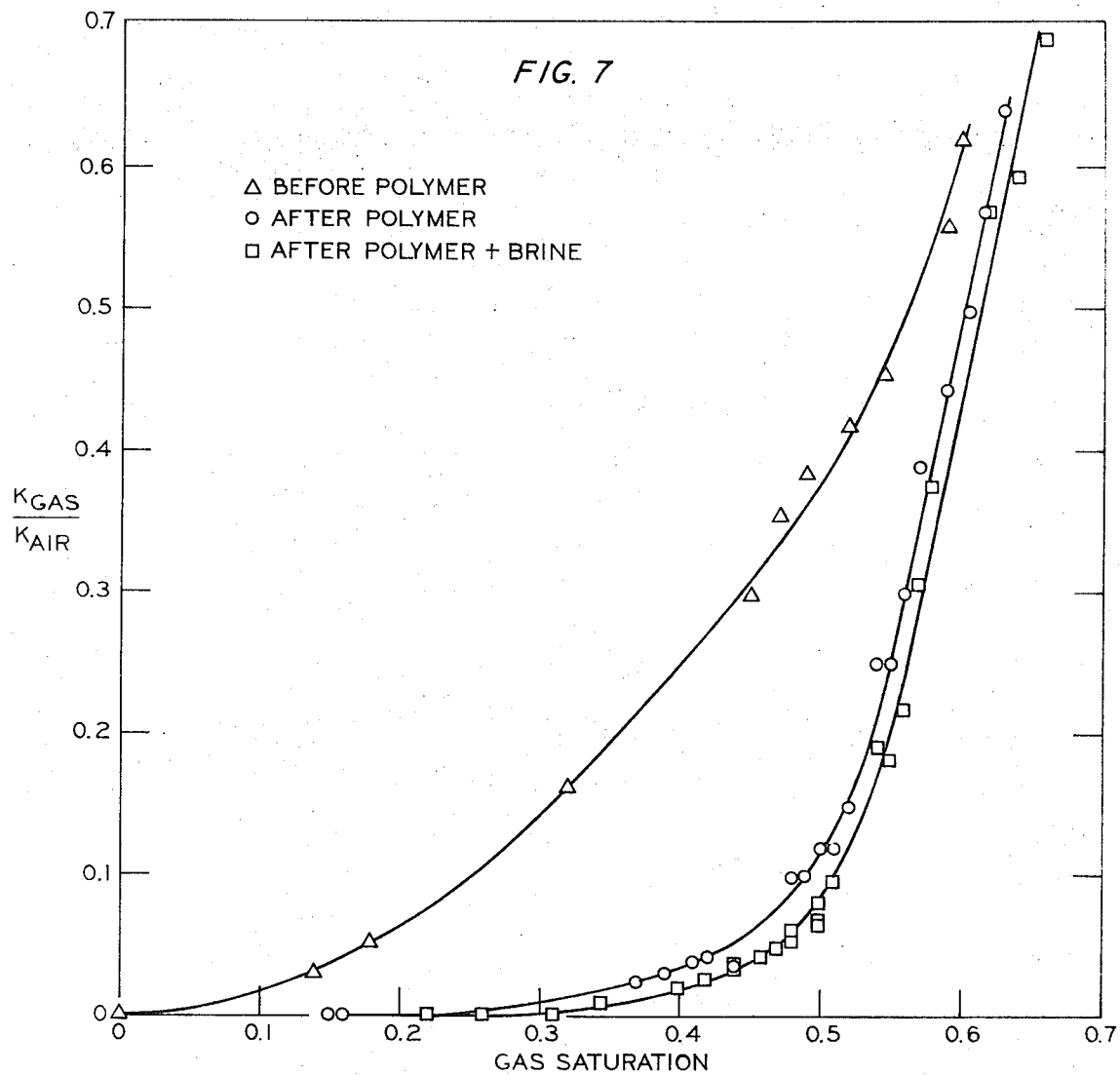

PRODUCTION METHOD

It is desirable to provide a method for reducing the gas/oil ratio of hydrocarbons produced from a subterranean hydrocarbon containing formation having a gas cap. Further, it is desirable to prevent gas coning during production of a well while adding gas to the gas cap of the formation for maintaining the pressure of the formation. Still further, it is desirable to provide a method for restricting the flow of gas from the gas cap with a greatly reduced amount of polymeric material.

This invention therefore resides in a method for producing hydrocarbons from a subterranean hydrocarbon containing formation and reducing the flow of gas from a gas cap of the formation by passing a preselected volume of polymeric solution into the formation at an elevation lower than the gas cap, terminating the injecting of the polymeric solution, and producing fluid entering the well bore while at least intermittently injecting one of a gas-water admixture or volumes of gas and water into the gas cap.

Other aspects, objects, and advantages of the present invention will become apparent from a study of the disclosure, the appended claims, and the drawings.

The drawings, in

FIGS. 1 to 7 are diagrammatic view of comparative tests of the method of this invention and FIGS. 8-11 illustrate views of the well bore and formation upon which the method of this invention is being used.

In the drawings, FIG. 1 illustrates the change in gas relative permeability with pore volumes of gas injected into a core taken from Grayberg limestone, South Cowden Unit, Ector County, Texas; which was treated with a partially hydrolyzed polyacrylamide solution. It can be readily ascertained that 2.5 pore volumes of a 3,000 ppm of a 1:10 percent of a 1-10 percent hydrolyzed polyacrylamide solution contained in a South Cowden brine (77,000 ppm total solids) restricted the gas flow to about 20 percent of its prepolymer value even after 15,000 pore volumes of gas throughput. The core was then flooded with 3 pore volumes of South Cowden brine so that the rock pores were filled mostly with brine although there was still residual polymer on the rock surfaces. This liquid system reduces the gas flow rate for a time, but the gas flow rate rose to approximately its original value after 18,000 pore volumes of gas.

FIG. 2 illustrates the before polymer, after polymer, and after brine flood treatment of a Grayberg limestone, South Cowden Unit, Ector County, Texas, core according to the method of the invention. A partially hydrolyzed polyacrylamide solution wherein the polyacrylamide was hydrolyzed from 1 to 10 percent was admixed with a South Cowden brine wherein the polyacrylamide concentration was 3,000 ppm.

FIG. 3 illustrates an application of polyethylene oxide having a molecular weight of $4.0 \times 10^6$ constituting 2,500 ppm solution with South Cowden brine as applied in a Grayberg limestone South Cowden Unit, Ector County, Texas core.

FIG. 4 illustrates the application of a 27-33 percent hydrolized polyacrylamide having a molecular weight in excess of $1 \times 10^6$ wherein a 2,500 ppm solution of same is utilized in a Vacuum Abo brine having 56,000 ppm solids. The core utilized was an Abo Reef limestone, Vacuum Abo Unit, Lea County, New Mexico.

FIG. 5 illustrates the use of another viscous solution wherein a carboxylmethyl cellulose having a molecular weight of $7.0-9.0 \times 10^5$ and comprising 1,000 ppm in a South Cowden brine was applied to a Grayberg limestone, South Cowden Unit, Ector County, Texas core sample.

FIG. 6 illustrates a similar application as that of FIG. 4 with the exception that the degree of hydrolysis for the polyacrylamide was 5-10 percent as compared to 27-30 percent.

FIG. 7, as was FIG. 6, related to FIG. 4, varying only in the degree of hydrolysis of the polyacrylamide.

FIGS. 2-7 represent the results wherein gas relative permeability was plotted against gas saturation for three nitrogen floods of the respective core samples. FIGS. 2-7 illustrate that the gas relative permeability curves are essentially identical after both the polymer flood and the brine flood, therefore demonstrating that the resistance to gas flow is approximately the same whether the fluid in the core is polymer or brine. The more viscous polymer solution is simply harder to displace from the rock pores, thus polymer systems which hold aqueous fluids more tightly in place do, in fact, provide better gas flow control.

Figure 8:
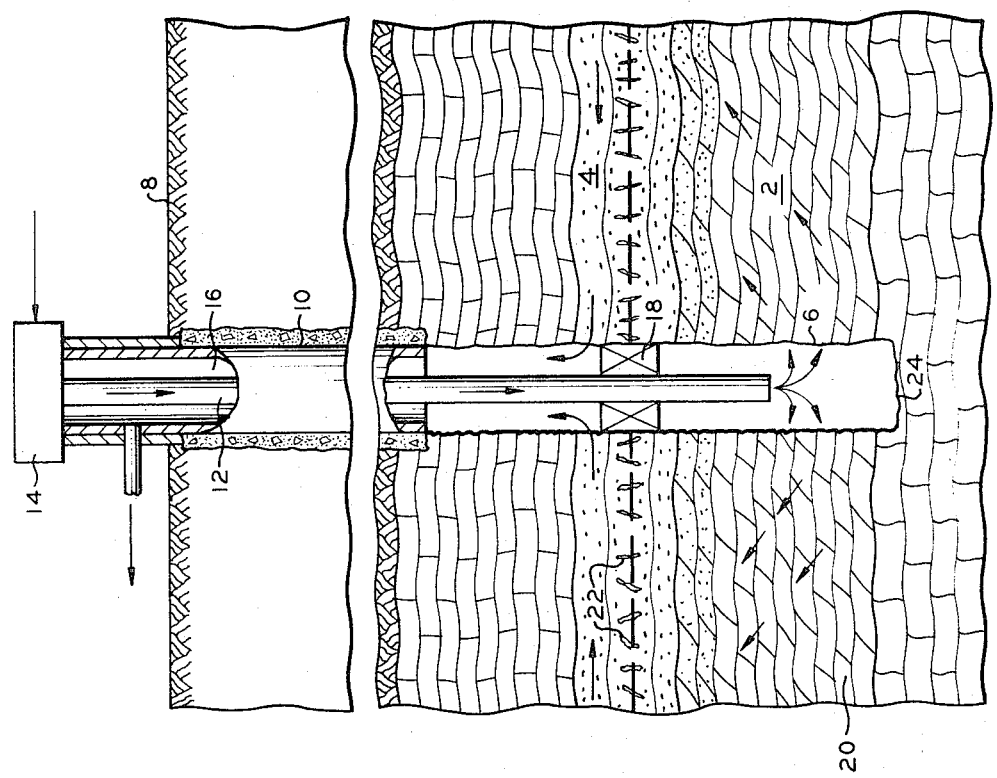

Referring to FIG. 8, a subterranean hydrocarbon containing formation 2 having a gas cap 4 is penetrated by first well bore 6 extending from the earth's surface 8 through the gas cap 4 and into the formation 2 to an elevation lower than the gas cap 4. The well bore 6 has casing 10 and tubing 12 installed therein with a well head 14 providing for passing fluids through the tubing 12 and the annular 16 formed between the tubing 12 and casing 10. A packer 18 is installed for isolating the gas cap 4 from the lower portion 20 of the formation 2 and well bore 6.

In the method of this invention, a preselected volume of polymeric solution is passed downwardly through the well bore 6 and into the hydrocarbon containing formation 2 at a location lower in elevation than the gas cap 4.

The polymeric solution injected is of a volume sufficient and has a polymer concentration sufficient for decreasing the permeability between the gas cap and the lower portion 20 of the formation 2 over a preselected radial distance from the well bore. That volume, as is known in the art, is dependent upon the type of formation 2, permeability, porosity, and other factors which can be determined by a core analysis and calculations which are routinely made by one skilled in the art.

It is recommended that the polymer utilized be one of partially hydrolyzed polyacrylamides, polysaccharide carboxylmethyl cellulose, or polyethylene oxide.

It is recommended that the concentration of polymer in the polymeric solution be in the range of about 1,000 to about 5,000 ppm. Concentrations greater than about 5,000 ppm are undesirable because they will cause a plugging of the oil zone with a resultant waste of hydrocarbons, and concentrations less than about 1,000 ppm are undesirable because at lower concentrations the polymers will not provide significant resistance to gas flow.

It is also preferred that the volume of polymer injected be in the range of about 2 to about 50 barrels per foot of pay zone open to oil production. Lesser volumes than about 2 are undesirable because gas will break throgh polymer slug before the protective brine overlayer is in place, and greater volumes than about 50 are undesirable because too large a fraction of the injected polymer will go into the oil-producing zone.

During injection of the polymeric solution, it is desirable to pass gas from the gas cap 4 upwardly through the annulus 16 in order to facilitate movement of the polymeric material into zones 22 of high permeability between the gas cap 4 and lower portion 20 of the formation 2. Owing to the fact that the polymeric solution will follow the paths of least resistance, said polymeric solution will pass into zones 22, but the producing of the gas cap while injecting the polymeric material will promote a better seal between the zones 4, 20 of the formation 2.

Figure 1:
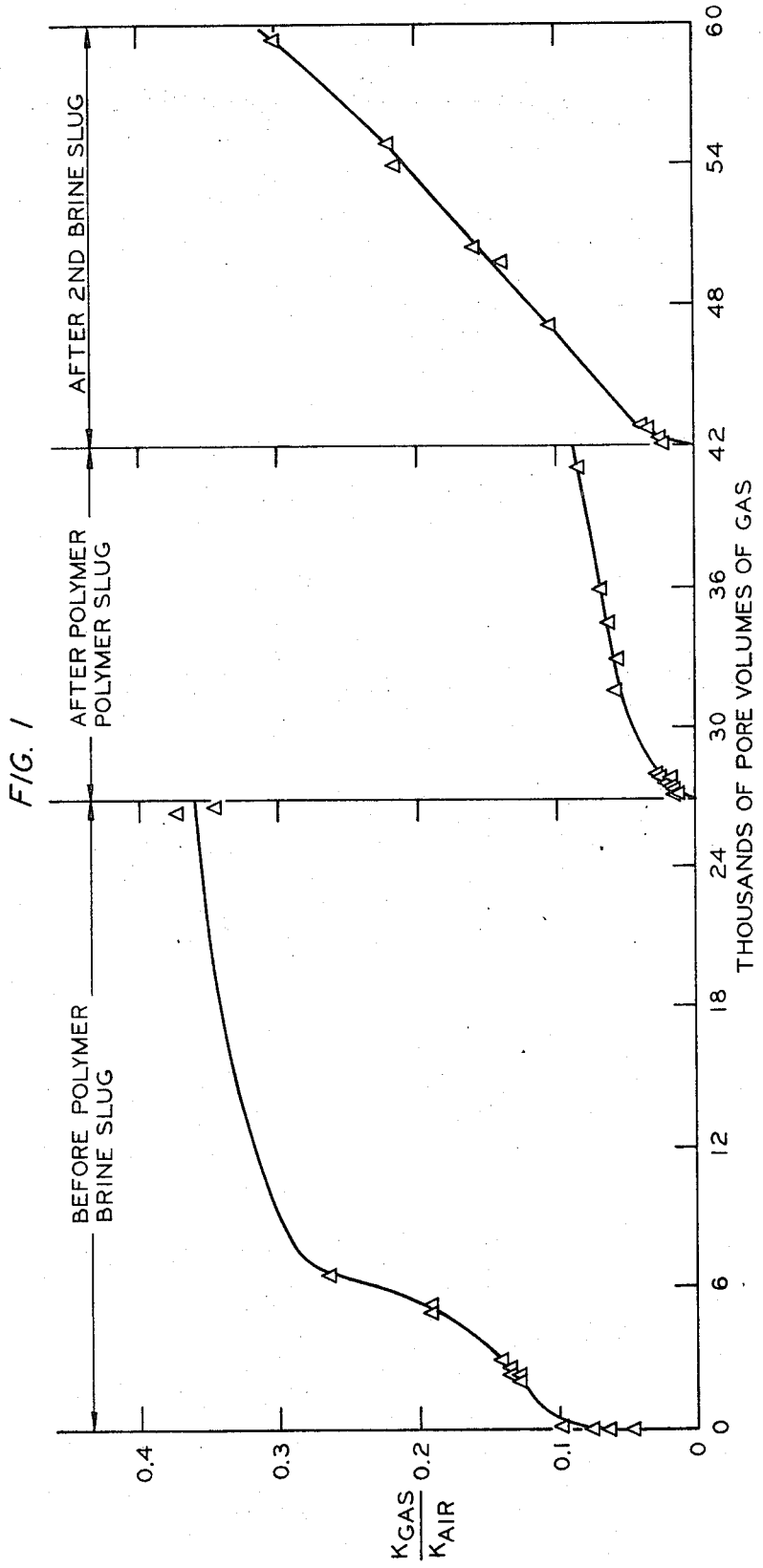
Figure 2:
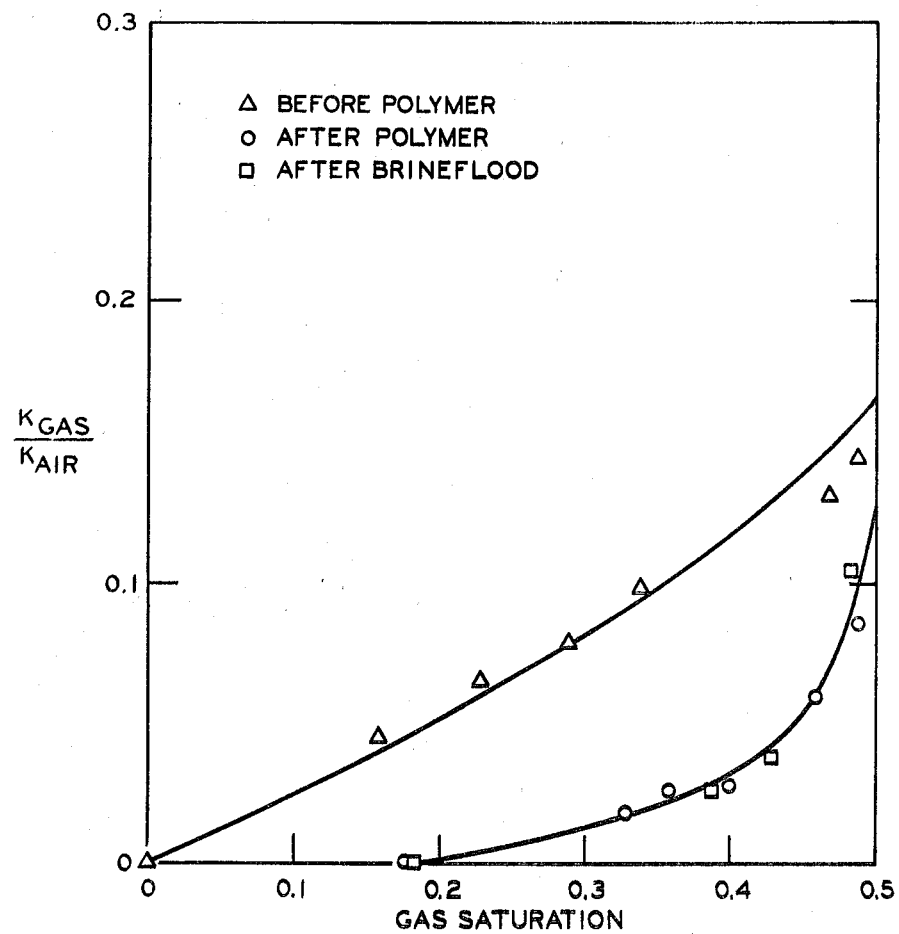
Figure 9:
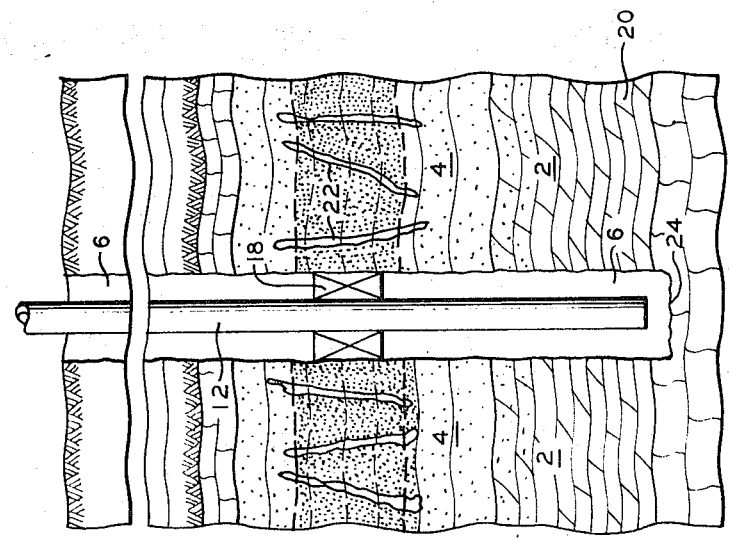

Referring to FIG. 9, the polymeric solution injection is terminated after the desired volume of polymer has been injected. It may then be desirable to lower the tubing 12 to a position near the bottom 24 of the well bore. This will further facilitate subsequent production of hydrocarbons from the lower portion 20 of the formation 2 while reducing the volume of gas produced from the gas cap 4. As further shown in FIG. 9, the polymeric material is positioned in the pores and zones 22 of highest permeability forming a radially extending boundary between the gas cap 4 and the oil zone 20.

Figure 10:
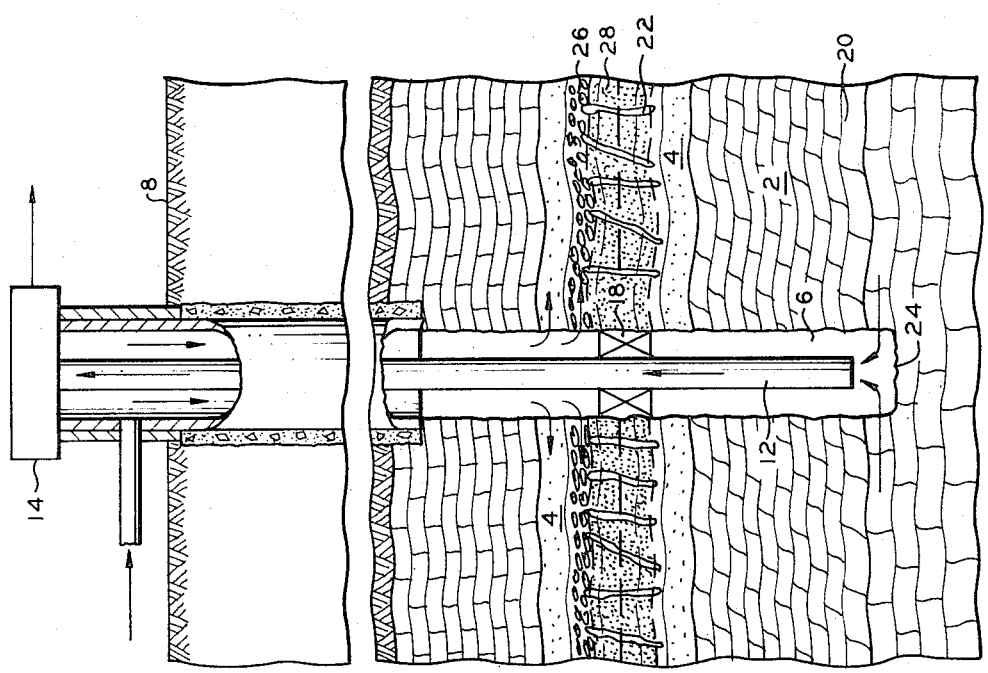

Referring to FIG. 10, fluids entering the well bore are thereafter produced through the tubing 12 while one of a gas-water admixture or volumes of gas and water are at least intermittently injected downwardly through the annulus 16 and into and through the gas cap 4 of the formation 2. The gas-water admixture can be continuously injected into the gas cap 4. In another embodiment, gas can be continuously injected to the gas cap 4 with intermittent portions of gas being admixed with water or the gas can be injected in slugs separated by intervening slugs of water.

In order to provide and maintain a uniform layer of water 26 overlaying the polymeric layer 28, it is preferred that the material injected into the gas cap 4 be a gas-water admixture.

As can be seen in FIG. 10 and by the data of FIGS. 1–7, the water layer 26 facilitates a prevention of gas coning and permits the use of less polymer thereby decreasing waste, labor, and the likelihood of damaging the lower portion 20 of the formation 2 by polymeric plugging.

It is preferred that the gas-water injection is at a rate sufficient for maintaining the pressure of the gas cap 4 and thereby conserving the driving force of the formation. This rate is dependent upon production history and physical properties of the well and the desired pressure maintenance program and is a function which is routinely performed by one skilled in the art.

Figure 11:
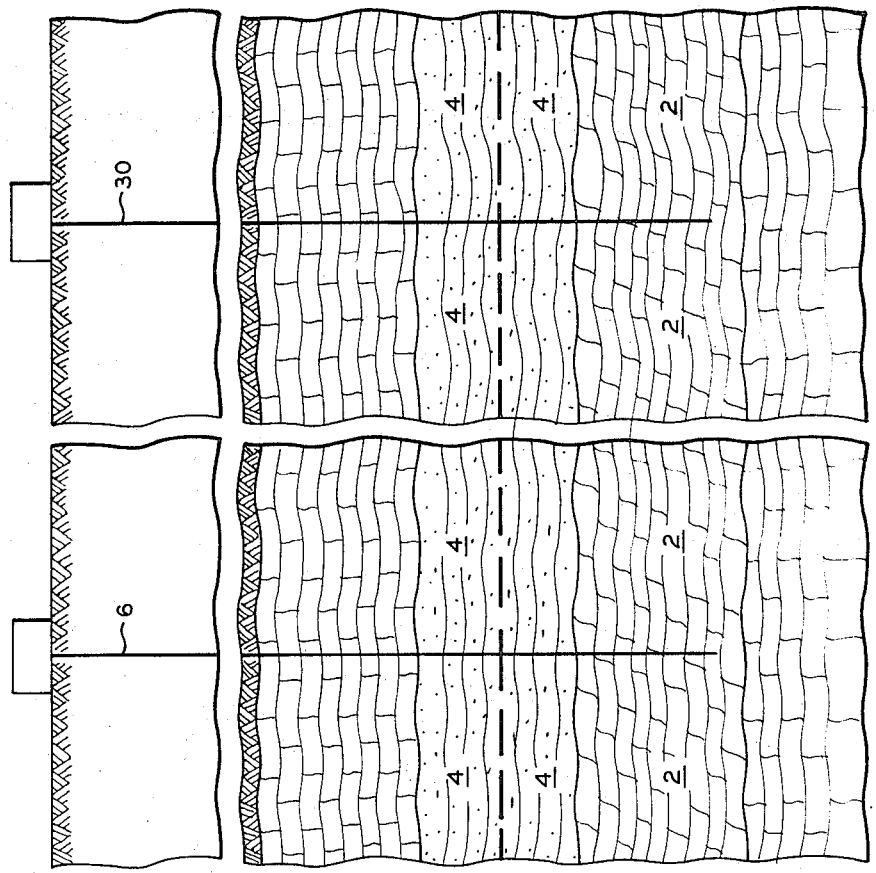

Referring to FIG. 11, where the formation 2 has been produced for a considerable period prior to utilizing the method of this invention, it is recommended that gas or gas-water admixture or gas and water be injected into the gas cap 4 via a second well bore 30 penetrating the subterranean hydrocarbon containing formation at a location spaced from the first well bore 6. This second well bore 30 can be treated and produced as the first well bore 6 or can be an injection well as is known in the art of pressure maintenance or secondary recovery.

The water of the gas and water injected into the gas cap 4 may be brine having a solids concentration up to about 125,000 ppm. Although almost any oil reservoir brine can be used, a brine with solids concentration below about 5,000 ppm is preferred because there is less chance of corrosion due to oxygen leaks and because some polymers, especially polyacrylamides, form more viscous solutions in the presence of low-salt brines.

In order to reduce the amount of labor and equipment, it is also desirable that the gas of the gas and water injected is hydrocarbon gas produced from the formation 2. After a preselected time sufficient to form a layer of water 26 of sufficient magnitude, as determined by reservoir calculations, the amount of water injected per unit time can be decreased. Generally, however, the gas and water admixture injected should have a volume ratio in the range of about 500 to about 50,000 gas per water as measured at standard conditions. Lower ratios are undesirable because excessive brine injected will reduce gas injectivity and cause water coning at the lower perforations, and higher ratios are undesirable because insufficient water will be injected to protect the polymer slug before gas begins fingering through it.

Other modifications and alterations of this invention will become apparent to those skilled in the art from the foregoing discussion and accompanying drawings, and it should be understood that this invention is not to be unduly limited thereto.

What is claimed is:

1. A method for producing hydrocarbons from a subterranean hydrocarbon-containing formation penetrated by at least a first well bore and reducing the flow of gas into said well bore from a gas cap positioned in the upper portion of said formation, comprising:
    passing a preselected volume of polymeric solution into the hydrocarbon-containing formation at a location lower in elevation than the gas cap;
    terminating the injection of the polymeric solution; and
    producing fluids entering the well bore while at least intermittently injecting one of a gas-water admixture, or volumes of gas and water into said gas cap of said hydrocarbon-containing formation.

2. A method, as set forth in claim 1, wherein the gas and water injected is substantially continuously injected during producing of fluids entering the well bore.

3. A method, as set forth in claim 1, wherein the gas and water injection is at a rate sufficient for maintaining the pressure of the gas cap.

4. A method, as set forth in claim 1, wherein the polymeric solution injected is of a volume sufficient and a polymer concentration sufficient for decreasing the permeability between the gas cap and underlying portions of said formulation over a preselected radial distance from the well bore.

5. A method, as set forth in claim 1, wherein the concentration of polymer in the polymeric solution is in the range of about 1,000 to about 5,000 parts per million.

6. A method, as set forth in claim 1, wherein the polymer of the polymeric solution is one of partially hydrolyzed polyacrylamides, carboxylmethyl cellulose, or polyethylene oxide.

7. A method, as set forth in claim 1, wherein the water of the gas and water injected is brine having a salt concentration less than about 5,000 parts per million.

8. A method, as set forth in claim 1, wherein the gas of the gas and water injected is hydrocarbon gas produced from said formation.

9. A method, as set forth in claim 1, including a second well bore penetrating the subterranean hydrocarbon-containing formation at a location spaced from the first well bore and injecting gas downwardly through the second well bore and into the gas cap of said formation for moving fluids through the formation and into the first well bore.

10. A method, as set forth in claim 9, wherein the gas and water is injected into the formation through the second well bore.

11. A method, as set forth in claim 1, wherein the gas-water admixture has a volume ratio in the range of about 500 to about 50,000 gas/water as measured at standard conditions.

12. A method, as set forth in claim 1, wherein the volume of polymer injected is in the range of about 2 to about 50 barrels per foot of pay zone near oil-producing perforations.

13. A method, as set forth in claim 1, wherein separate volumes of gas and water are intermittently injected into the gas cap and including decreasing the water injected after a preselected period of time.

14. A method, as set forth in claim 1, including producing gas from the gas cap through the first well bore while injecting the polymeric solution into the formation.

\* \* \* \* \*